US009536203B2

(12) United States Patent
Wunderling (10) Patent No.: US 9,536,203 B2
(45) Date of Patent: *Jan. 3, 2017

(54) METHOD FOR SOLVING LINEAR PROGRAMS

(71) Applicant: International Business Machines Corporation, Armonk, NY (US)

(72) Inventor: Roland Wunderling, Graz (AT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/857,773

(22) Filed: Sep. 17, 2015

(65) Prior Publication Data

US 2016/0086092 A1    Mar. 24, 2016

Related U.S. Application Data

(63) Continuation of application No. 13/559,849, filed on Jul. 27, 2012, now Pat. No. 9,177,256.

(30) Foreign Application Priority Data

Jul. 27, 2011   (EP) .................................... 11175484

(51) Int. Cl.
*G06F 7/38* (2006.01)
*G06N 7/00* (2006.01)
*G06F 17/16* (2006.01)

(52) U.S. Cl.
CPC ................. *G06N 7/00* (2013.01); *G06F 17/16* (2013.01)

(58) Field of Classification Search
CPC .......... G06F 17/12; G06F 17/11; G06F 17/16; G06F 17/10; G06F 7/49989
(Continued)

(56) References Cited

U.S. PATENT DOCUMENTS 4,894,773 A * 1/1990 Lagarias ................ G06Q 10/06
                                                        705/7.11
6,035,277 A * 3/2000 Anbil ..................... G06Q 10/06
                                                        705/7.25
(Continued)

OTHER PUBLICATIONS

Graves, G. W., and R.D. McBride, "The Factorization Approach to Large-Scale Lihnear Programming",Mathematical Programming 10, 1, 91-110 (1976).
(Continued)

*Primary Examiner* — Tan V. Mai
(74) *Attorney, Agent, or Firm* — Steven M. Greenberg, Esq.; CRGO Law (57) ABSTRACT

The invention provides for a computer-implemented method for solving a linear program (LP), the method comprising the steps of:
  receiving (100) the linear program;
  determining (101) a kernel K and determining a kernel matrix G of the kernel K, wherein the kernel matrix is a non-singular submatrix of the original matrix;
  determining (102) a set of non-basic variable indices and a set of extra constraint indices;
  computing (103) a primal kernel vector ($x^K$) from the determined kernel;
  computing (104) a dual kernel vector ($y^K$) from the determined kernel; and
  evaluating (105) the feasibility of the primal kernel vector and of the dual kernel vector.

17 Claims, 2 Drawing Sheets

(58) Field of Classification Search
USPC .......................................................... 708/446
See application file for complete search history.

(56) References Cited

U.S. PATENT DOCUMENTS 7,257,451 B2* 8/2007 Carpency ............... F25J 3/0219
700/28
2007/0016837 A1* 1/2007 Candes ................. H03M 13/03
714/746

OTHER PUBLICATIONS

McBride, "A Spike Collective Dynamic Factorization Algorithm for the Simplex Method", Management Science 24, 10, 1031-1042, Jun. 1978.
Todd, M.J. "Large-scale linear programming: Geometry, working bases and factorizations", Mathematical Programming 26, 1, 1-20 (1983).
Brown, G.G. and M.P. Olson, "Dynamic factorization in large-scale optimization", Mathematical Programming 64, 1-3, 17-51 (1994).

* cited by examiner

METHOD FOR SOLVING LINEAR PROGRAMS

CROSS-REFERENCE TO RELATED APPLICATIONS

This application is a Continuation of U.S. application Ser. No. 13/559,849, filed on Jul. 27, 2012, now U.S. Pat. No. 9,177,256, which claims priority to European Patent Application 11175484.2, filed Jul. 27, 2011, the entirety of which are incorporated herein by reference.

DESCRIPTION

Field of the Invention

The present disclosure relates to the field of computing linear program solutions. More particularly, the present disclosure relates to computing linear program solutions by applying a modified simplex method.

Background

Linear programming is a mathematical method for determining the best outcome in a given mathematical model for some list of requirements represented as linear relationships. Linear programming is a specific case of mathematical programming whereby an objective function, subject to linear equality and linear inequality constraints, is optimized. Linear programming can be utilized for many engineering problems, but also for business-related problems. The simplex method, in particular the simplex method in the context of mixed integer programming, herein also referred to as 'traditional simplex method', is one of the most important tools for solving linear programs. U.S. Pat. No. 6,067,259, for example, discloses a method for repairing faulty elements of memory cells for storing data therein, whereby said method makes use of the traditional simplex method. However, in recent years, LP model sizes have increased significantly and the dimensions of the problems to be solved more and more frequently even go beyond the possibilities of powerful processing devices.

SUMMARY OF THE INVENTION

It is an object of embodiments of the invention to provide for a more efficient approach for solving linear programs. This object is solved by the features of the independent claims. Preferred embodiments of the invention are given in the dependent claims.

In mathematical terms, linear programs are problems that can be expressed in a variety of forms, the most common one being the inequality form and the equality form.

In its most general form, a linear program can be formulated as:

min/max $c^T x$ subject to $LV \leq Ax \leq RV$ and $lv \leq x \leq uv$ wherein LV, RV are m-dimensional constraint range vectors and lv, uv are n-dimensional variable bound vectors. To simplify the presentation, in the following a simplified form will be used. Said simplified notation form is referred herein as inequality form and is denoted by 'formula LP' as:

minimize $c^T x$ subject to $Ax \geq b$ and $x \geq 0$ (formula LP)

where x represents the vector of variables to be determined, c and b are vectors of known coefficients and A is a known matrix of coefficients with appropriate dimensions. A is herein also referred to as 'original matrix'. The expression to be maximized or minimized ($c^T x$ in this case) is called the objective function. The equations $Ax \geq b$ are the constraints to be respected when optimizing the objective function, whereby $A \in R^{m \times n}$, $b \in R^m$, $c \in R^n$, and m, $n \in N^+$, "$c^T$" is the transpose of vector c.

Notations and Definitions

One of the most common approaches for solving LPs is the simplex method, herein also referred to as 'Traditional simplex Method' (TSM). In order to use the TSM approach, the linear program needs to be transformed into equality form:

minimize $\bar{c}^T \bar{x}$ subject to $\bar{A}\bar{x} = \bar{b}$ and $\bar{x} \geq 0$ (formula LP=)

In order to transform a linear program given as formula LP to equality form, slack variables can be used. Said slack variables s are introduced such that $\bar{x}^T = (x^T, s^T)$, $\bar{c}^T = (c^T, 0)$, $\bar{A} = (A, -I)$ and $\bar{b} = b$. Thereby, I is the unit matrix. $\bar{A}$ is the extended matrix of A, $\bar{x}$ is the extended vector of x, $\bar{c}$ is the extended vector of c. The matrix $\bar{A}$ of the equation form has exactly as many more columns than A as there are rows in A. Using the TSM approach may be disadvantageous, because the extended matrix has more columns than the original matrix.

In TSM, a basis matrix is chosen from the extended matrix in order to define a candidate solution for the LP and to compute updates to move to a new candidate solution while executing one or more simplex iterations. In each iteration of the TSM, two linear systems need to be solved using the basis matrix. The basis matrix consists of columns of the extended matrix which together form an invertible submatrix of $\bar{A}$. The basis matrix is of the dimension of the number of rows of the problem matrix A and typically comprises structural columns that are also present in the original matrix A and so called artificial or slack columns which were introduced by the $-I$ matrix. While executing the one or more TSM simplex iterations, the basis matrix is updated. The TSM may be implemented as primal simplex algorithm or as dual simplex algorithm.

Kernel Simplex Method

In one aspect, the invention relates to a computer-implemented method for solving a linear program LP, the method comprising the steps of:

receiving the linear program, a canonical form of the linear program being: minimize $c^T x$; subject to $Ax \geq b$; $x \geq 0$, whereby x represents the vector of variables to be determined, b in $R^m$ and c in $R^m$ respectively represent a vector of given coefficients and original matrix (A) represents a matrix of given coefficients, determining a kernel K and determining a kernel matrix G of the kernel K, wherein the kernel K=(D, B), wherein the kernel matrix G is calculated as $G = A_{DB}$, wherein B is a set of basis variable indices, D is a set of defining constraint indices such that $D \subseteq \{1, \ldots, m\}$, $B \subseteq \{1, \ldots, n\}$, $|D|=|B|$, and the kernel matrix is a non-singular submatrix of the original matrix;

determining a set of non-basic variable indices N and a set of extra constraint indices E, wherein $N = \{1, \ldots, n\} \backslash B$ and $E = \{1, \ldots, m\} \backslash D$;

computing (103) a primal kernel vector ($x^K$) from the determined kernel such that $Gx_B^K=b_D$, $x_N^K=0$;

computing (104) a dual kernel vector ($y^K$) from the determined kernel such that $y_E^K=0$, $(y_D^K)^T G=c_E^T$;

evaluating the feasibility of the primal kernel vector and of the dual kernel vector, in case the primal kernel vector is feasible and the dual kernel vector is infeasible, execute a modified primal simplex algorithm wherein the kernel and the kernel matrix are updated to increase feasibility of the dual kernel vector in one or more modified simplex iterations until the dual kernel vector is also feasible or a first termination condition is reached;

in case the primal kernel vector is infeasible and the dual kernel vector is feasible, executing a modified dual simplex algorithm wherein the kernel and the kernel matrix are updated to increase feasibility of the primal kernel vector in one or more modified simplex iterations until the primal kernel vector is also feasible or until a second termination condition is reached;

in case the primal and the dual kernel vectors are feasible as a result of executing the modified primal or dual simplex algorithm, the primal kernel vector is returned as the vector of variables x to be determined.

The kernel matrix $A_{DB}$ will in the following be referred to by the symbol 'G'. The relation of the kernel matrix G to the set of indices B and D will be explicitly mentioned whenever considered as helpful by explicitly repeating the construction specification of the kernel matrix G as $G=A_{DB}$. A 'non-singular matrix' is a matrix whose columns are independent from each other. In other words, a non-singular matrix is a matrix in which no row or column contains a linear combination of any other row or column, respectively. The primal kernel vector is uniquely defined by the kernel. This is also the case for the dual kernel vector.

The modified simplex method according to embodiments of the invention will in the following also be referred to as 'kernel simplex method' (KSM). In other words, embodiments of the kernel simplex method may be regarded as a revised variant of the primal and dual simplex algorithm having been developed to cope also with linear programs with a very high number of variables and constraints and a correspondingly high degree of complexity. Embodiments of the kernel simplex method are based on the idea of applying the traditional simplex method on a linear program, but instead of maintaining a factorization of a basis matrix when carrying out the simplex method, a factorisation of the kernel matrix, which is typically smaller than the basis matrix, is maintained for carrying out calculations in KSM. Embodiments of the KSM may be conceived as a reformulation of the TSM in such a way that the dual formulation is structurally equivalent to the primal formulation. This may allow for a novel implementation of the simplex method according to which the primal and dual algorithm are completely symmetrical. Such an implementation may offer performance advantages over TSM. According to embodiments, the modified kernel simplex algorithm is applied instead of the TSM for obtaining a repair solution for repairing faulty memory elements as described in U.S. Pat. No. 6,067,259.

The kernel matrix may be selected from the original matrix in various ways. According to embodiments, the kernel matrix may be selected e.g. as the 0-by-0 matrix or as any other non-singular sub-matrix of the original matrix. Using the kernel matrix, i.e. a sub-matrix of the original matrix instead of the basis matrix used in TSM may be advantageous, because an extension of the original matrix for obtaining the basis matrix is not required and the dimension of the kernel matrix is therefore typically smaller than the dimension of the basis matrix. This saves memory and processing power as it allows to hold a much larger matrix and thereby a much larger number of variables to be determined in memory. Using a kernel matrix instead of a basis matrix may also be advantageous as an introduction of slack variables for obtaining the basis matrix is made unnecessary. Said features may be advantageous, because they may also provide for a reduction of the processing power needed for solving said linear program. As a consequence, linear programs with a large number of variables may be resolved also on processing devices with limited processing power and memory, e.g. mobile devices and/or embedded systems such as smart cards. In a further advantageous aspect, using the comparatively small kernel matrix allows solving mathematical problems with more variables than feasible with current simplex implementations as less memory space and processing power may be required.

According to further embodiments, a kernel slack vector $s^K$ is calculated such that $s^K=Ax^K-b$. A kernel reduced cost vector $d^K$ is calculated such that $(d^K)^T=c^T-(y^K)^T A$. The primal kernel vector is feasible if $x^K \geq 0$ and $s^K \geq 0$ and the dual kernel vector is feasible if $y^K \geq$ and $d^K \geq 0$. The kernel matrix is optimal if both the primal kernel vector and the dual kernel vector are feasible.

According to still further embodiments, the method further comprises:

in case neither the primal nor the dual kernel vector is feasible, automatically modifying the linear program for making either the primal or the dual kernel vector feasible;

modifying the linear program implies relaxing the bounds until feasibility is reached. For example, in case the condition $Ax^K \leq b$ is violated, b is expanded for all rows of b which are violated. Thus, either the primal bounds are relaxed for obtaining a primal feasible kernel or the dual bounds are relaxed for obtaining a dual feasible kernel;

solving the modified linear program by executing the modified primal or dual simplex algorithm; Thus, according to the above example, b' is obtained which fulfills condition $Ax^K \leq b'$. after having solved the modified linear program, undoing the modification and using an optimal kernel for the modified program as intermediate result; Undoing the modification in the above example implies, for example, undoing the relaxation of the bounds. The resulting kernel is dual feasible for the unmodified linear program in case the primal hounds were relaxed in the previous step; the resulting kernel is primal feasible for the unmodified linear program in case the dual hounds were relaxed in the previous step; and executing the modified primal or dual simplex algorithm on the un-modified linear program, whereby the optimal kernel of the modified linear program is used as input.

In other words, in case neither the primal nor the dual kernel vector is feasible, a so called 'phase I' approach is applied as known in the art in order to provide for a feasible dual or primal kernel vector. Other examples for modifying the linear program in the phase I of the traditional simplex algorithm are known in the art.

According to embodiments, the original matrix is stored in a first copy in a row-wise data structure and in a second copy in a column-wise data structure for executing the modified primal simplex algorithm and the modified dual simplex algorithm respectively, the row-wise data structure and the column-wise data structure being of the same data structure type. According to embodiments, said data structure is in particular a sparse data structure, e.g. a column major order representation as is currently used e.g. in FORTRAN and MATLAB.

According to embodiments, the kernel matrix is stored as part of the data structure comprising the original matrix. All nonzero elements in each column of the original matrix which are also contained in the kernel matrix are sorted in such a way that all said nonzero elements are grouped together to form an adjacent sequence of rows in each kernel column. And all nonzero elements in each row of the original matrix which are also contained in the kernel matrix are sorted in such a way that all said nonzero elements are grouped together to form an adjacent sequence of columns in each kernel row. Said features may be advantageous, as they may allow reading from and writing to the memory blocks more efficiently, because the nonzero rows and columns typically accessed together are stored in succeeding memory blocks of the data structure.

According to further embodiments, the steps of the computer-implemented method for executing the modified primal simplex algorithm are based on a first piece of source code and the steps of the computer-implemented method for executing the modified dual simplex algorithm are based on a second piece of source code. The first and the second piece of source code differ from each other only in that the pointers in the first source code pointing to columns of the kernel matrix are used as pointers to rows of the kernel matrix in the second source code and the pointers in the first source code pointing to rows of the kernel matrix are used as pointers to columns of the kernel matrix in the second source code.

According to still further embodiments, the same source code is used for implementing a method for executing the modified dual and the modified primal simplex algorithm, wherein in case pointers to columns of the kernel matrix are used as input arguments for said method, the modified primal simplex algorithm is executed, and wherein in case pointers to rows of the kernel matrix are used as input arguments for said method, the modified dual simplex algorithm is executed. Said features may be advantageous, because they may allow using two almost identical pieces of source code or even only one single piece of source code both for solving the dual and the primal linear problem of a linear program. Thus, modifications in the source code need to be introduced only once and immediately can be used both for solving the dual simplex algorithm as well as the primal simplex algorithm. The instructions used for solving the dual simplex algorithm access the same data structure as do the instructions for solving the primal simplex algorithm, but the pointers to the rows and the columns of the kernel matrix are interchanged, respectively.

According to further embodiments, the method further comprises the steps of factorizing the kernel matrix and storing the generated factorization in a factorization data structure, wherein the factorization is preferentially an LU-factorization. According to further embodiments, the factors resulting from the factorization or their respective transpose are stored in the same factorization data type. For example, a 'column major order representation' could be used as factorization data type, i.e., a data type used for storing the factorization. For example, a factor or its transpose may be stored in an array element of a 'column major order representation' used e.g. in FORTRAN and MATLAB. In addition to updating the kernel matrix, the factors of the factorization may be updated, a step which is herein also referred to as 'updating the factorization'. According to preferred embodiments, each modified simplex iteration comprises the steps of 'pricing', 'ratio test' and 'kernel update'. While executing the kernel update step, the indices of the kernel are modified. In case a factorization was calculated from the kernel matrix, e.g. based on an LU-factorization, said preferred embodiments update the kernel and also update the factorization of the kernel. Thus, the updated factorization can be used to solve linear systems with the updated kernel matrix.

According to embodiments, the method further comprises the step of automatically evaluating whether updating the factors with the results provided by one of the one or more modified simplex iterations is computationally more expensive than creating the factors in a new factorization step de novo. A factorization of the kernel matrix is calculated for each modified simplex iteration de novo unless the evaluation returns as result that updating the factors is computationally less expensive than calculating a new factorization. In this case, an existing factorization of the kernel matrix is updated instead of calculating a new factorization of the kernel matrix. Said features may be advantageous as they may provide for an even more efficient implementation of the modified simplex method. For example, an evaluation result may depend on a comparison of the dimensions of a current factorization and the dimensions of the kernel. If the dimension of the current factorization exceeds the dimension of the kernel matrix by more than a threshold value, the calculation of a new factorization may be determined to be less computationally demanding.

According to further embodiments, the step of updating the kernel matrix when executing the modified primal simplex algorithm is selected from the group comprising:

shrinking the kernel and the kernel matrix, wherein shrinking comprises removing one first row index from the set of defining constraint indices D, thereby removing a first row being indicated by the first row index from the kernel matrix, and removing one first column index from the set of basic variable indices B, thereby removing a first column being indicated by the first column index from the kernel matrix; For example, in case the first row index i and the first column index q were determined, then the kernel is updated such that $D \rightarrow D\setminus\{i\}$, $B \rightarrow B\setminus\{q\}$; or extending the kernel and the kernel matrix, wherein the extension comprises adding a second row index to the set of defining constraint indices D, thereby adding a second row being indicated by the second row index to the kernel matrix, and adding a second column index to the set of basic variable indices B, thereby adding a second column being indicated by the second column index to the kernel matrix; for example, in case the second column index j and the second row index p were determined, then the kernel matrix is extended such that $B \rightarrow B \cup \{j\}$ and $D \rightarrow D \cup \{p\}$; or exchanging a column index of the kernel and exchanging a column indicated by said index of the kernel matrix, the exchange comprising removing a first column index from the set of basic variable indices B, thereby removing a first column being indicated by the first column index from the kernel matrix, and adding a second column index to the set of basic variable indices B, thereby adding a second column being indicated by the second column index to the kernel matrix; For example, in case the second column index j and the first column index q were determined, then the kernel matrix is updated such that $B \rightarrow B \setminus \{q\} \cup \{j\}$;

exchanging a row index of the kernel and exchanging a row indicated by said index of the kernel matrix, the exchange comprising removing a first row index from the set of defining constraint indices D, thereby removing a first row being indicated by the first row index from the kernel matrix, and adding a second row index to the set of defining constraint indices D, thereby adding a second row being indicated by the second row index to the kernel matrix; For example, in case the first row index i and the second row index p were determined, the kernel is updated such that $D \rightarrow D \setminus \{i\} \cup \{p\}$;

According to further embodiments, an LU factorization of the kernel matrix is used for solving linear systems with the kernel matrix. Said LU factorization can be computed from scratch from the kernel matrix or can be updated at each iteration of KSM. According to further embodiments, the update of the LU factorization when performing a column or row exchange of the kernel matrix is done by a Forrest-Tomlin update. Note, that in this context it is customary to speak of an updated LU-factorization of an updated matrix even if the resulting data structure is not exactly an LU factorization of the updated matrix. Instead it is a data structure based on the original factorization that allows solving linear systems with the updated kernel matrix using an extended solve procedure.

According to further embodiments, executing each of the modified primal simplex iterations comprises executing a pricing step and a ratio test step. In the pricing step the second column index or the first row index is determined, wherein the second column index is determined by selecting a column index j such that $d^K_j \leq 0$ and wherein the first row index i is determined by selecting a row index i such that $y^K_i \leq 0$. In the ratio test step the second row index p and the first column index q is determined, wherein the second row index p is selected such that $p = \mathrm{argmin}\{\lambda_i : i \in E\}$ and the first column index q is selected such that $q = \mathrm{argmin}\{\mu_j : j \in B\}$, wherein $\lambda$ and $\mu$ represent the step length obtained by fulfilling a bound of the corresponding variable or slack index with equality. In case the first column index q is smaller than the second row index p, the first column index q is returned, and wherein in case the first column index q is larger than the second row index p the second row index p is returned. Depending on the embodiment, in case of the first column index q equals the second row index p, any of said two indices p or q may be returned.

According to embodiments, executing one of the modified primal simplex iterations comprises executing a kernel update step. Executing the kernel update step comprises one of the following steps:

in case the second column index was determined and the second row index was returned, the kernel matrix is extended;

in case the first column index was determined and the second column index was returned, the column exchange is executed on the kernel matrix;

in case the first row index was determined and the second row index was returned, the row exchange is executed on the kernel matrix;

in case the first row index was determined and the first column index was returned, the kernel matrix is shrunk.

In other words, according to embodiments, executing each of the modified simplex iterations comprises executing a pricing step, executing a ratio test step for determining the rows and/or columns to be added and/or to be removed, and executing the kernel update step. In the pricing step the second column index being indicative of the second column to be added or the first row index being indicative of the first row to be removed is determined; In the ratio test step the second row index being indicative of the second row to be added or the first column index being indicative of the first column to be removed is determined;

According to further embodiments, the kernel matrix is factorized, thereby generating a LU-factorization, the LU-factorization being updated upon an update of the kernel matrix at least for one modified simplex iteration, wherein updating the LU factorization when exchanging a column or a row is executed according to a Forrest-Tomlin update and wherein updating the LU factorization when shrinking the kernel matrix comprises:

updating the LU factorization, thereby propagating the removal of said determined row and column to the LU factorization, the update of the LU factorization being executed according to one of the following steps:

A) applying a column-wise Forrest-Tomlin update suitable for replacing the first column with a first unit vector having the element 1 in the position of the first row; or B) applying a row-wise Forrest-Tomlin update suitable for replacing the first row with a second unit vector having the element 1 in the position of the first column to be removed from the kernel matrix; or C) applying a column-wise Forrest-Tomlin update suitable for replacing the first column with a first unit vector having the element 1 in the position of first row, and applying a row-wise Forrest-Tomlin update suitable for replacing the first row with a second unit vector having the element 1 in the position of the first column to be removed from the kernel matrix.

The updated LU factorization will be of higher dimension than the updated kernel matrix. Thus, the extended solve procedure must first lift the right-hand side vectors of the linear systems to be solve into the dimension of the updated LU factorization, perform the solve in this dimension and project out the unused dimension to get back to the space of the updated kernel matrix. This can be implemented implicitly without extra computational overhead.

According to further embodiments, executing the LU-factorization when extending the kernel matrix comprises:

if the second row has in a previous kernel update step been removed from the kernel matrix while the LU factorization has been updated according to step A), the LU factorization is updated by applying a Forrest-Tomlin update suitable for replacing the first unit vector introduced in said previous step A) with said second column;

if the second column has in a previous kernel update step been removed from the kernel matrix while the LU factorization has been updated according to step B), the LU factorization is updated by applying a Forrest-Tomlin update suitable for replacing the second unit vector introduced in the previous step B) with said second row;

if the LU factorization has been updated in a previous kernel update step according to step C), the LU factorization is updated by applying a Forrest-Tomlin update being suitable for replacing the first unit vector introduced in the previous step C) with said second column and being suitable for replacing the second unit vector introduced in the previous step C) with said second row;

in all other cases, adding a new row to be computed from the second row to a lower triangular matrix L and adding a new column to be computed from the second column to an upper triangular matrix U, the upper triangular matrix and the lower triangular matrix having been created by the LU-factorization from the kernel matrix.

The term 'preceding' as used herein relates to a step having been executed within any preceding modified simplex iteration since the last fresh factorization of the kernel.

In a further aspect, the invention relates to a computer-readable non-transitory storage medium comprising instructions which, when executed by a processor of a processing device, cause the execution of the steps of anyone of the previous embodiments of the modified simplex method.

A 'computer-readable storage medium' may be, for example and without limitation, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device. Program code embodied on a computer-readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

In a further aspect, the invention relates to a processing device comprising a processor and a computer-readable non-transitory storage medium comprising instructions which, when executed by the processor, cause the execution of the steps of anyone of the previous embodiments of the modified simplex method. In the following sections, embodiments of the KSM method will be disclosed in greater detail. Thereby, a detailed mathematical explanation of embodiments of the invention is given in order to make clear the differences between the traditional simplex method TSM and the modified, kernel based simplex method KSM.

KSM: Notation and Definitions

The linear program to be solved by the KSM is given according to formula LP:

minimize $c^T x$ subject to $Ax \geq b$ and $x \geq 0$ \hfill (formula LP)

whereby m, n∈N$^+$, A∈R$^{m \times n}$, b∈R$^m$ and c∈R$^n$.

Therein, a 'kernel' is an ordered pair K=(D, B), where D $\subseteq$ {1, . . . , m}, B $\subseteq$ {1, . . . , n}, and and |D|=|B| such that the matrix G=A$_{DB}$ is a non-singular submatrix of A. The matrix G corresponding to the kernel K is referred to as 'kernel matrix'.

Thereby, the below notations are used:
B the set of basic variable indices
N the set of non-basic variable indices, whereby N= {1, . . . , n}\B
D the set of defining constraint indices
E the set of 'extra' or 'non-defining' constraint indices, whereby E={1, . . . , m}\D A kernel in KSM and a basis in TSM are related, as these names suggest, as there is a one-to-one mapping between both. A basis in TSM as well as a kernel in KSM are used to define a complimentary pair of primal and dual solution vectors. For KSM the primal solution vector is defined by fixing all non-basic variables at their bounds and using the defining constraints to compute the basic variables. Similarly, the dual solution vector is computed by setting the dual variables for the extra constraints E to 0 and computing the dual variables for the defining constraints D by using the columns comprising the basis variables.

In more mathematical terms, kernel vectors can be defined as follows: given a kernel K=(D, B) for the linear program LP, the primal kernel vector $x^K \in R^n$ can be calculated such that $Gx_B^K = b_D$, $x_N^K = 0$, wherein $G=A_{DE}$.

The kernel slack vector $s^K$ is calculated as follows: $s^K = Ax^K - b$.

Similarly, the dual kernel vector $y^K \in R^m$ s is calculated as follows: $y_E^K = 0$, $(y_D^K)^T A_{DE} = c_B^T$.

The kernel reduced cost vector $d^K$ is calculated as follows: $(d^K)^T = c^T - (y^K)^T A$.

Proposition 1 (complementarity): Let K=(D, B) be a simplex kernel for LP, and $x^K$, $s^K$, $y^K$ and $d^K$ be the corresponding kernel vectors. $(x^K, s^K)$ and $(y^K, d^K)$ satisfy the complementary slackness conditions of Linear Programming.

Duality: It is well known that the dual problem to formula LP is:

maximize $b^T x'$ subject to $A^T x' \leq c$ and $x' \geq 0$ \hfill (formula LP')

The 'x' formulated for the primal problem thereby corresponds to the 'x'' of the dual problem after having transposed b, c and A. The dual model LP' has the same structure as the primal model LP and thus allows to directly apply the definition of a kernel. This is an important difference to TSM.

Proposition 2 (dual kernel): K=(D, B) is a kernel for problem LP if K'=(B, D) is a kernel of LP'. Further, the primal kernel vectors of K correspond to the dual kernel vectors of K', i.e.:

$x^K = y'^{K'}$, $s^K = -d'^{K'}$ $y^K = x'^{K'}$, $d^K = -s'^{K'}$

From the complementary slackness of a primal and dual kernel vector pair the following definitions can be made: a simplex kernel K is called primal feasible if $x^K \geq 0$ and $s^K \geq 0$. It is called dual feasible if $y^K \geq 0$ and $d^K \geq 0$. A kernel that is both primal and dual feasible is called an optimal kernel.

Kernel optimality: If K is an optimal kernel of LP, $x^K$ is an optimal solution of LP and $y^K$ an optimal solution of LP'.

TSM Basis and KSM Kernel: A Comparison

The primal kernel vectors for the dual problem according to formula (LP') match the dual kernel vectors for the primal problem according to formula (LP) up to a sign. In addition, the primal kernel vectors for the dual as well as for the primal problem are computed according to embodiments of the invention using exact the same sub-matrixes and sub-vectors except for transposition. The same is not true in the formulations used for the TSM neither using a column basis nor using a row basis.

a) Comparison of the kernel and a column basis: In the following section, the TSM using a column basis will be referred to as the column simplex method (CSM). CSM is not defined on an LP according to formula (LP) but requires a linear program in augmented equality form:

minimize $\bar{c}^T \bar{x}$ subject to $\bar{A}\bar{x} = \bar{b}$ and $\bar{x} \geq 0$      (formula LP$^=$)

A column basis is defined as a pair $C=(\bar{B}, \bar{N})$, where $|\bar{B}|=m, \bar{B}, \bar{N} \subseteq \{1, \ldots, \bar{n}\}$ are disjoint, $\bar{B} \cup \bar{N} = \{1, \ldots, \bar{n}\}$ and the sub-matrix $\bar{A}_{\bar{B}}$ is non-singular. Thus $\bar{A}$ must be of full rank and have at least as many columns as rows (the definition of a kernel for KSM does not require any such restriction!). The dual formulation of (LP$^=$) is min $\bar{b}^T\bar{x}$ s.t. $\bar{A}^T \bar{x}^T \geq \bar{c}$ and is thus structurally different from formula (LP$^=$). This difference requires devising both, a primal and a dual simplex algorithm separately for CSM whereas primal and dual algorithms for KSM are mostly identical except that they respectively operate on a transposed kernel matrix.

In order to use CSM to solve linear programs of the form (LP), artificial and/or slack variables $s \geq 0$ are introduced for each row by defining $\bar{A}=(A,-I)$, $\bar{c}^T=(c^T,0)$, $\bar{x}^T=(x^T,s^T)$, and $\bar{b}=b$. Thus, $\bar{n}$, n+m and a basis matrix for (LP$^=$) typically consists of some columns of A and some of $-I$. Let B denote the basic columns of A, I the m×m unit matrix, E the basic columns of $-I$, and D the indices of the zero rows in $I_E$. Then the column basis matrix can be written as:

$$\bar{A}_{(B,B)} = \begin{pmatrix} A_{EE} & -I_{EE} \\ G & 0 \end{pmatrix}, \quad (\overline{LP})$$

wherein $G = A_{DE}.$

The notation was chosen in such a way that one immediately recognizes the kernel matrix $G=A_{DB}$. In fact, all linear systems using the basis matrix $\bar{A}_{(B,E)}$ can be computed by solving linear systems with the kernel matrix and computing the matrix-vector product with $A_{EB}$. This can be used to prove that $K=(D,B)$ is a kernel of LP if $(\bar{B}, \bar{N})$ with $\bar{B} = H \cup \{j+n : j \in N\}$ and $\bar{N} = \{1, \ldots, n+m\} \setminus \bar{B}$ is a basis for LP$^=$. In effect, by doing so for the primal and dual basis vectors using CSM the kernel vectors for KSM are returned using the kernel $K=(D, B)$.

b) Comparison of the kernel and a row basis: in the following section, a TSM-based approach using a row basis is referred to as the row simplex method (RSM). Again, RSM is not defined on an LP in the form of (LP) but requires a linear program in augmented row form:

minimize $\tilde{c}^T \tilde{x}$ subject to $\tilde{A}\tilde{x} \geq \tilde{b}$      (formula LP$^+$)

A row basis is defined as a pair $R=(\tilde{B}, \tilde{N})$ where $\tilde{B}, \tilde{N} \subseteq \{1, \ldots, \tilde{m}\}$ are disjoint, $(\tilde{B} \cup \tilde{N}) = \{1, \ldots, \tilde{m}\}$, $|\tilde{B}|=n$, and the sub-matrix $\tilde{A}_{\tilde{B}}$ is non-singular. Thus $\tilde{A}$ must be of full rank and have at least as many rows as columns (unlike KSM!). As for CSM, the dual formulation of (LP$^+$) for RSM does not have the same form thus requiring two separate algorithms for the primal and dual simplex method.

In order to transform linear programs specified according to formula (LP) into the form (LP$^+$), the bounds are added as explicit constraints to the model matrix, i.e., $\tilde{A}^T=(A^T, I)^T$, $\tilde{b}^T=(b^T, D)^T$, $\tilde{c}=c$, and $\tilde{x}=x$. Let D denote the basic rows in A, N the basic rows in I, and B the indices of the zero columns $I_N$. Then the row basis matrix can be written as:

$$\tilde{A}_{(D,N)} = \begin{pmatrix} A_{DN} & G \\ I_{NN} & 0 \end{pmatrix},$$

wherein $G = A_{DB}.$

As for the column basis, the kernel matrix $G=A_{DB}$ is found, whereby the notation was chosen in such a way that one immediately recognizes that the row basic constraints of A correspond to the defining constraints in KSM. All linear systems with the basis matrix can be solved by solving linear systems with the kernel matrix alone plus an additional matrix-vector product. Again, doing so for the primal and basis vectors reproduces the primal and dual kernel vectors.

c) Comparison of the kernel and basis matrices Consider the problem matrix A of formula (LP) and its extensions for CSM and RSM and letting $K=(D, B)$ be a kernel of LP. Using the notation $S+i=\{j: j=s+i, s \in S\}$, it can easily be seen that the following row and column basis are equivalent to the kernel K:

| Method | Kernel/basis | Matrix |
|---|---|---|
| KSM | $K = (D, B)$ | $G = A_{DB}$ |
| CSM | $C = (B \cup E + n, N \cup D + n)$ | $(A_{\cdot B}, I_{\cdot E})$ |
| RSM | $R = (D \cup N + m, E \cup B + m)$ | $\begin{pmatrix} A_D \\ I_N \end{pmatrix}$ |

The above table lists the key-matrix for the methods, i.e., the kernel for KSM and the basis matrices for CSM and (the less well known) RSM. In the kernel matrix is in fact the sub-matrix that is shared between the basis matrices for CSM and RSM. This property makes KSM a hybrid between CSM and RSM which promises to exploit the advantage is of both without having to choose ahead of time.

In-Depth Description of an Embodiment of the Kernel Simplex Algorithm

According to embodiments, the KSM method works in exactly the same way as TSM except that the simplex iterations are computed using the kernel instead of a basis. In particular, the goal of KSM is to find an optimal kernel by performing simple updates to it involving only a single row index and/or column index manipulation at each iteration.

a) The Primal Simplex Algorithm

In the following, phase II of the primal algorithm is explained in greater detail. It is assumed, that a primal feasible kernel has already been found and that the algorithms proceeds to find an optimal kernel. Phase I may be executed exactly in the same way as for TSM while still using kernel matrices instead of basis matrices.

Given a feasible kernel K for (LP), one or more modified simplex iterations are executed, whereby each modified simplex iterations comprises the following sub-steps:

1. pricing: find a dual infeasible element in $y^K$ or in $d^K$. If not available, STOP—the kernel is optimal. Otherwise compute a primal search direction $\Delta x$ and $\Delta s = A\Delta x$.
2. ratio test: find a maximum step length $\sigma$ such that $x^K + \sigma\Delta x$ as well as $s^K + \sigma\Delta s$ remains primal feasible. If $\sigma = \infty$ STOP—the model is unbounded. Otherwise, $\sigma$ identifies a blocking variable or slack variable that is used for the next step.
3. kernel update step: change $K \to K'$ in order to reflect the elements found in step 1 and 2 and update the kernel vectors accordingly. As a result, a transition $x^K \to x^{K'}$ and $y^K \to y^{K'}$ is performed.
4. Goto 1.

The steps 1-3 differ from the TSM and are therefore described in greater detail in the following.

Pricing: in order to test dual feasibility for the kernel, it is necessary to verify that $y^K \geq 0$ and that $d^K \geq 0$. If the kernel is dual infeasible one can find a column index $j \subset N$ or a row index $i \in D$ such that $y_j^K < 0$ or $d_i^K < 0$. Thus it is necessary to distinguish between two cases j and i, wherein the primal update vectors are computed respectively. In either case, the primal update vector is the ray into the feasible region of the linear program from the current kernel solution. Therefore, it is computed by keeping all defining bounds and constraints fixed except for the one that has been chosen.

Case j: in case an index j was selected with $d_j^K < 0$, for $j \in N$, the primal update vectors are denoted with $\Delta x = \Delta^j x$ and $\Delta s = \Delta^j s$. Computing the primal update vectors: the primal update vector $\Delta^j x$ is computed by keeping all defining constraints tight and all non-kernel variables other than j at its bound, whereas j is moved to 1 (a constraint $a^T x \leq b$ is said to be tight if $a^T x = b$). Thus one obtains:

$$A_D \Delta^j x = 0 \quad \text{(first constraints)}$$

$$(\Delta^j x)_{N'} = (e_j)_{N'} \quad \text{(second constraints)}$$

where $e_j$ denotes the j-th unit vector in dimension n.

By inserting the second constraints into the first constraints, $(\Delta^j x)_K$ can be computed by solving the following linear system with the kernel matrix:

$$A_{DE}(\Delta^j x)_B = -A_{Dj}.$$

By inserting into $\Delta^j s = A\Delta^j x$ and by separating out the rows in E and D one gets:

$$(\Delta^j s)_D = 0 \quad \text{(formula 1)}$$

$$(\Delta^j s)_E = A_g \Delta^j x$$
$$= A_{Ej} + A_{EE}(\Delta^j x)_B$$

Case i: in case an index i was selected with $y_i^K < 0$, for $i \in D$, the primal update vectors are denoted with $\Delta x = \Delta^i x$ and $\Delta s = \Delta^i s$.

Similar to the previous case, the primal update vector $\Delta^i x$ is computed by keeping all non-kernel variables at their bounds and all defining constraints tight, except for constraint corresponding to index i which is changed by +1. Thus the following equations are obtained:

$$A_D \Delta^i x = (e_i)_D \quad \text{(first constraints)}$$

$$(\Delta^i x)_N = 0. \quad \text{(second constraints)}$$

where $e_i$ denotes the i-th unit vector in dimension m.

By inserting the second constraints into the first constraints $(\Delta^i x)_B$ can be computed by solving the following linear systems with the kernel matrix $A_{DE}(\Delta^i x)_B = (B_i)_D$.

Inserting this into $\Delta^i s = A\Delta^i x$ and separating out the rows in E and D one gets:

$$(\Delta^i s)_D = (e_i)_D$$

$$(\Delta^i s)_E = A_E \Delta^i x$$
$$= A_{EB}(\Delta^i x)_B$$

Ratio Test: In order to maintain primal feasibility the ratio test is performed on two vectors, i.e., the so called step length $\sigma$ is computed such that $x^K + \sigma\Delta x$ and $s^K + \sigma\Delta s$ remain primal feasible. The following vectors $\lambda \in R^m$ and $\mu \in R^n$ are calculated:

$$\lambda_i = \begin{cases} -\dfrac{s_i^K}{\Delta s_i} & \text{if } \Delta s_i < 0 \\ \infty & \text{otherwise} \end{cases}$$

$$\mu_j = \begin{cases} -\dfrac{x_j^K}{\Delta x_j} & \text{if } \Delta x_j < 0 \\ \infty & \text{otherwise} \end{cases}$$

The elements of $\lambda$ and $\mu$ represents the step length obtained by fulfilling the bound of the corresponding variable or slack index with equality. In order to maintain primal feasibility, the minimum step length needs to be selected. It is known by construction that $\lambda_i = \infty$ for $i \in D$ and $\mu_j = \infty$ for $j \in N$. Therefore it is only necessary to consider elements $j \in B$ and $i \in E$. Let:

$$p = \operatorname{argmin}\{\lambda_i : i \in E\}$$

$$q = \operatorname{argmin}\{\mu_j : j \in B\}$$

$$\sigma = \min\{\lambda_p, \mu_q\}$$

If $\sigma = \infty$ the model is proven to be unbounded and $\Delta x$ is an unbounded direction.

Kernel Update: At this point an index i or j was selected in the pricing step and an index p or q was selected in the ratio test. All four combinations are possible and respectively require their individual kernel update:

| | | Pricing selection | |
|---|---|---|---|
| | | j | i |
| Ratio test selection | q | Replace column q with j: $B \to B\backslash\{q\} \cup \{j\}$ | Shrink kernel: $B \to B\backslash\{q\}$ $D \to D\backslash\{i\}$ |
| | p | Extend kernel: $B \to B \cup \{j\}$ $D \to D \cup \{p\}$ | Replace row i with p: $D \to D\backslash\{i\} \cup \{p\}$ |

Said four cases will in the following be referred to as (q, j), (q, i), (p, j) and (p, i). It can easily be shown that K' is indeed a primal feasible kernel, and that the solution value changed by $\sigma c^T \Delta x$. Under non-degeneracy condition follows the finiteness of the algorithms.

The Dual Simplex Algorithm

As was pointed out before, the dual program (LP') is of the same format as the primal program (LP). Thus no separate dual algorithm needs to be devised. Instead, the primal algorithms can be directly applied to the dual formulation.

Implementation of the KSM

According to embodiments, the KSM is implemented such that only the minimum number of processing steps has to be executed at each modified simplex iteration. This is done by updating the required data rather than computing it from scratch at each iteration. In particular, the kernel matrix is stored in factored form and the factors are updated. According to some embodiments, in addition the kernel vectors are updated rather than recomputed at each iteration. Only in case updating is deemed numerically instable or computationally more expensive than re-computing, a fresh kernel factorization and new kernel vectors are computed from scratch.

a) Kernel Vector Updates

According to embodiments of the invention, the updates for the primal kernel vectors follow immediately form the definition of the update vectors and step length $$x^K \to x^{K'} = x^K + \sigma \Delta x \text{ and } s^K \to s^{K'} = s^K + \sigma \Delta s.$$

Similar formulas are obtained for updating the dual kernel vectors:

$$y^K \to y^{K'} = y^K + \sigma \Delta y \text{ and } d^K \to d^{K'} = d^K + \sigma \Delta d.$$

Depending on whether p or q was selected, one obtains:

$$\Delta y_E = 0$$

$$\Delta y_B = \Delta^p y_B = A_{DB}^{-T}(e_p)_B \quad \text{Case p:}$$

$$\Delta y_E = -(e_p)_E$$

$$\Delta y_D = \Delta^q y_D = A_{DB}^{-T} A_{pD}^{-T} \quad \text{Case q:}$$

where $e_p$ denotes the p-th unit vector in dimension m.

In both cases $\Delta d = A^T \Delta y$ is obtained, whereby only $\Delta d_N$ needs to actually be computed. The dual step length $\tau$ as well depends on whether i or j were determined:

Case i: $\tau = \dfrac{y_i^K}{\Delta y_i}$

Case j: $\tau = \dfrac{d_j^K}{\Delta d_j}$ b) Updating the Factorization

According to embodiments of the invention, instead of solving linear systems with the kernel matrix G of kernel K from scratch, at each iteration of the modified simplex algorithm an LU factorization of the kernel K is either calculated from scratch or is updated. Whether the factorization is calculated de novo or an existing factorization is updated depends whether an automated estimation of the computational effort returns as result that the updating or a new calculation is computationally more expensive. According to preferred embodiments, an LU-factorization is used wherein G=LMU, where M initially is a diagonal matrix and L and U are lower and upper triangular matrices, respectively, having only the value '1' in the diagonal. Said features may be advantageous, as the factorization is kept symmetric. The same data type may be used for storing the factors resulting from the factorization and their respective transpose. Thus, the same source code can be used for solving the equation system LMU x=b and the equation system $x^T$ LMU=$b^T$. This is because, upon transposition, one gets: $(LMU)^T x = U^T M^T L^T x = b$; thus, $U^T$ is the lower triangular matrix and $L^T$ is the upper triangular matrix and $U^T M^T L^T$ is the LU factorization of the transposed kernel.

Regarding the 4 cases (q,i), (p,i), (q,j) and (p,j) as shown in the above table, two of said cases are well known from TSM: replacing a column with a new one is the standard operation of the tradition revised simplex algorithm, and replacing a row with a new one is just the transposed operation. To the contrary, extending and shrinking the kernel are new and particular to embodiments of the modified simplex method (KSM). In the following, said four cases will be described in greater detail.

b.1) Column Updates (q, j)

The column updates presented in this chapter are also known in the art as 'Forrest-Tomlin updates'. Only the column update, i.e. case (q, j), will be discussed here as the row update, i.e. case (p,i), is just the transposed. Replacing column $\bar{q}$ of G with the new vector $v=A_{Dj}$ can be done by multiplying G from the right with a rank-1 update matrix C, where $C = I + (\tilde{c} - e_{\bar{q}})e_{\bar{q}}^T$ and $G\tilde{c} = v$. Thereby, $e_{\bar{q}}$ denotes the restriction of the $\bar{q}$-th unit vector to the subspace defined by D. In other words, $\bar{q}$ is the index of column q in the kernel matrix G and $e_{\bar{q}}$: the corresponding unit vector in kernel space. After some updates the LU factorization of G will have the form G=LMU, where M is initially the diagonal and becomes the product of non-singular matrices through more updates. Thus applying C to the factorization amounts to computing G'=GC=LMUC. The idea is to reformulate the last product as $UC = \bar{R}^{-1} \bar{U}'$, where R is a row rank-1 update matrix and $\bar{U}'$ can be permuted to upper triangular form. This can be achieved by choosing: $\bar{R} = I + e_{\bar{q}}(\bar{c} - e_{\bar{q}})^T$ with $\bar{c}^T U = e_{\bar{q}}^T$. In fact, $\bar{U}'$ is given as:

$$\begin{aligned}
\bar{U}' &= \bar{R}UC = (I + e_q(\bar{c} - e_q)^T)U(I + (\tilde{c} - e_q)e_q^T) \\
&= U + e_q\bar{c}^T U - e_q e_q^T U + U\tilde{c}e_q^T + e_q\bar{c}^T U\tilde{c}e_q^T - \\
&\quad e_q e_q^T U\tilde{c}e_q^T - Ue_q e_q^T - e_q\bar{c}^T Ue_q e_q^T + e_q e_q^T Ue_q e_q^T \\
&= U - e_q U_q - U_q e_q^T + U_{qq} e_q e_q^T + U\tilde{c}e_q^T + c_q e_q e_q^T + \\
&\quad \tilde{c}_q e_q e_q^T - (U\tilde{c})_q e_q e_q^T + e_q e_q^T - e_q e_q^T e_q e_q^T.
\end{aligned}$$

The part $U - e_{\bar{q}}U_{\bar{q}} - U_{\bar{q}}e_{\bar{q}}^T + U_{\bar{q}\bar{q}}e_{\bar{q}}e_{\bar{q}}^T$ corresponds to matrix U with row and column $\bar{q}$ zeroed out. The term $U\tilde{c}e_{\bar{q}}^T$ is the new column $\bar{q}$ in U' except for the diagonal element which is adjusted by $+\tilde{c}_{\bar{q}} - (U\tilde{c})_{\bar{q}}$. Thus the diagonal element is $U'_{\bar{q}\bar{q}} = \tilde{c}_{\bar{q}} = (G^{-1}v)_{\bar{q}}$.

Since $\bar{U}'$ has only one element in row $\bar{q}$, it can be permuted to triangular form by permuting row and column $\bar{q}$ to the bottom right of the matrix. In order not to have to store diagonal elements for U, the permuted triangular matrix $\bar{U}'$ is required to only have 1's on the diagonal. Thus, $\bar{U}'$ is split according to $\bar{U}' = \Gamma U'$, where $\Gamma$ is a diagonal matrix with 1's on the diagonal except for $\Gamma_{\bar{q}\bar{q}} = \gamma_{\bar{q}}$. Setting $$R = (\bar{R}^{-1}\Gamma)^{-1} = I + e_{\bar{q}}\left(\frac{\bar{c}}{c_{\bar{q}}} - e_{q_t}\right)^T,$$

with $$\bar{c}^T U = e_q^T,$$

the factorization is updated as follows: $G' = LMR^{-1} U' = L \cdot M'U'$ with $M' = M \cdot R^{-1}$.

Solving linear systems using the factorization is done by multiplying the right-hand side vector with $U'^{-1} RM^{-1}L^{-1}$. Thus it is advantageous to store R directly instead of $R^{-1}$ in the data structure on which the update of the factorization is applied. In fact, only the vector $\bar{c}/\hat{c}_q$ and the index $\bar{q}$ need to be stored. Considering both row and column updates, the updated factorization after nr row and nc column updates are: $G'=L'\cdot C_{nc}^{-1} \ldots C_1^{-1}\cdot D\cdot R_1^{-1} \ldots R_{nr}^{-1}\cdot U'=L'\cdot M'\cdot U'$ where L' and R' can be permuted to lower and upper triangular form, respectively. Within KSM there is no computational effort involved for executing said updates, since all relevant vectors are readily computed for updating the kernel vectors. In fact, $c=(\Delta^i x)_E$ is obtained for $v=^A D_j$. Using the factorization G=LMU to compute $\tilde{c}=G^{-1}v$, at first c' is computed according to $c'=M^{-1}L^{-1}v$. Then, $U\tilde{c}=c'$ is solved.

The new column $\tilde{q}$ in U' is the intermediate vector c' and only needs to be stored away at that point during the computation of $(\Delta^i x)_E$. Similarly, in order to compute dual update vector $\Delta^q y_D$, $(\Delta^q y_D)^T$ needs to be computed: $(\Delta^q y_D)^T = e_{\bar{q}}^T G^{-1} = (e_{\bar{q}}^T U^{-1}) M^{-1} L^{-1}$. Thus, after the first step $\bar{c}=e_{\bar{q}}^T U^{-1}$ is also available and only needs to be stored away. Finally, $-\tilde{c}_q$ is simply the pivot element selected in the ratio test. In the following, the computational work of a column exchange in embodiments of KSM is compared with that of a corresponding column exchange in CSM. KSM only needs to update a factorization of dimension |D|, whereas CSM updates a factorization of dimension m. In particular, CSM has to remove all elements with indices i∈E from U and insert new ones instead. In KSM the elements in $A._q$ need to be separated between those in D and those in E. Those in E are added to $A_{EB'}$ for the new kernel K'=(D, B'), whereas those in D are used for updating the U. In total, there is no difference in work between KSM and CSM for the column entering the kernel or basis, respectively. However, for KSM the sub-vector $A_{E_q}$ does not have to be removed from $A_{EB'}$. This is advantageous, as said features may allow embodiments of the KSM to solve a linear program LP more efficiently than CSM.

Another operation is to replace $A_{Dj}$ with $A_{Dq}$ in the non-kernel part $A_{DN'}$. CSM needs to do the operation on all rows, i.e. replace $A._j$ with $A._q$. Depending what data structure is used, this may further strengthen the gain in efficiency of KSM compared to CSM. In particular, if a row representation of these (sub-) matrices is maintained (something is commonly done for non-partial pricing strategies), embodiments of the KSM require less work than CSM.

b.2) Row Updates (p,i)

In KSM a row exchange is just the transpose of a column exchange and needs no further exposition. However, the same is not true for TSM and thus a comparison of the involved work will be provided. A row exchange in TSM is done by replacing one slack variable for another in the basis. Here the manipulation of U is no work at all, but the Forest-Tomlin update in TSM puts all data representing the update into a M update. Such M updates are less efficient to process for the solution of a linear system than a triangular matrix. It is therefore of advantage for embodiments of the KSM that said embodiments perform a row update of the factorization instead and store the update mostly in the updated factor L' leaving only parts for M.

According to embodiments, KSM further has to separate the elements in $A_p$ into those belonging to N an those belonging to B. This work is comparable with steps of the CSM method executed in order to update rows i and p of the non-basic matrix. However, embodiments of the KSM method also need to replace $A_{iB}$ with $A_{pB}$ in $A._B$. Thus, in the case of row updates (I,p) have to be executed, CSM is expected to outperform KSM for such an update. However, when CSM performs its next factorization from scratch, said work will be performed implicitly by the factorization during the elimination of column singletons. Thus over all, ther is no disadvantage of KSM compared to CSM with respect to this case either.

b.3) Extending the Factorization (p,j)

In the case (p, j), one row and one column needs to be added to the kernel. Rather than rebuilding a new factorization, according to embodiments of the invention the previous one shall be reused and updated to the new dimensions. Let G=LMU be the old kernel matrix and its factorization and let $$G^+ = \begin{pmatrix} G & v \\ w^T & \kappa \end{pmatrix}$$

be the extended kernel. At first, the extended kernel matrix $G^-$ and its factors are constructed: $G^-=L^-M^-U^-$ is a LU factorization of $G^-$ if the following expressions are chosen:

$$G^- = \begin{pmatrix} G & 0 \\ 0 & 1 \end{pmatrix},$$

$$L^- = \begin{pmatrix} L & 0 \\ 0 & 1 \end{pmatrix},$$

$$M^- = \begin{pmatrix} M & 0 \\ 0 & 1 \end{pmatrix},$$

and $$U^- = \begin{pmatrix} U & 0 \\ 0 & 1 \end{pmatrix}.$$

In the next step, rank-1 update matrices are defined as $$R = \begin{pmatrix} I & 0 \\ \tilde{r}^T & 1 \end{pmatrix},$$

$$\Delta = \begin{pmatrix} I & 0 \\ 0 & \delta \end{pmatrix},$$

and $$C = \begin{pmatrix} I & \tilde{c} \\ 0 & 1 \end{pmatrix}$$

with $\tilde{r}^T G = w^T$, $G\tilde{c}=v$ and $\delta=\kappa-\tilde{r}^T G\tilde{c}$. It is easy to see that $G^+=RG^-\Delta C$. Note that the so called pivot element $\delta=\Delta' s_p$ is available from the update vectors.

Replacing $G^-$ and noting that $U^-\Delta=U^-$, $G^+$ is obtained as follows:

$$G^+ = RL^-M^-U^-\Delta C = \begin{pmatrix} I & 0 \\ \tilde{r}^T & 1 \end{pmatrix} L^- M \begin{pmatrix} I & 0 \\ 0 & \delta \end{pmatrix} U^- \begin{pmatrix} I & \tilde{c} \\ 0 & 1 \end{pmatrix} = \begin{pmatrix} L & 0 \\ \tilde{r}^T & 1 \end{pmatrix}\begin{pmatrix} M & 0 \\ 0 & \delta \end{pmatrix}\begin{pmatrix} U & U\tilde{c} \\ 0 & 1 \end{pmatrix} = L^+ M^+ U^+.$$

Thus, the extension of the factorization amounts to extending L with a new row $\tilde{r}^T L$, U with a new column $U\tilde{c}$ and the diagonal in M with a new diagonal element $\delta$. Both vectors $U\tilde{c}$ and $\tilde{r}^T L$ are computed anyway when computing the update vectors as is the pivot element $\delta$. Contrasting said embodiments again with TSM, one should note that for such an update TSM also has to insert $\grave{r}$ and $\grave{c}$ into the LU factorization for the update in this case. However, $\grave{c}$ in TSM the LU factorization is of dimension m whereas for KSM it is of dimension $|D| \le m$. Furthermore, traditional implementations of TSM updates put $\grave{r}$ into the update data structure M for the factorization, which is less efficient for subsequent solves than adding it to L.

b.4) Reducing the Factorization (q,i)

The last case considered is case (q,i) where the dimension of the kernel is reduced by one. Ideally, the factorization should be updated in such a way that a smaller dimensional data structure is the result of the update step. However, such an update would involve renumbering of the indices in the factorization and thus be inefficient. Instead, in one embodiment row and column updates are performed that replace the row and column to be removed with a (selected) unit vector. Thus, the updated factorization is of larger dimension than the updated kernel matrix, but due to its structure, it can still be used for solving linear systems with the kernel matrix. Other embodiments only replace the row or the column with a unit vector, but those are not elaborated on here. More precisely, an LU update is conducted that replaces row $\bar{i}$ and column $\bar{q}$ with unit vectors, where $\bar{q}$ is the index of column q in G and $\bar{i}$ is the index of row i in G. This is done e.g. by applying row and column rank-1 update matrices R and C, respectively, such that $$G \to G'^+ = R \cdot G \cdot C = (I + e_{\bar{q}}(\grave{r} - e_{\bar{q}})^T)G(I + (\grave{c} - e_{\bar{i}})e_{\bar{i}}^T) \quad \text{(formula 2)}$$

$$= \begin{pmatrix} G_{1...\bar{q}-1, 1...\bar{i}-1} & 0 & G_{\bar{q}+1...k, 1...\bar{i}-1} \\ 0 ... 0 & \kappa & 0 ... 0 \\ G_{\bar{q}+1...k, 1...\bar{i}-1} & 0 & G_{\bar{q}+1...k, \bar{i}+1...k} \end{pmatrix}$$

for some suitably chosen value K. Denoting the pivot element with $$\pi = e_{\bar{q}}^T G^{-1} e_{\bar{i}}^T,$$

this is achieved by choosing $\grave{r}$ and $\grave{c}$ such that $G\grave{c}=\gamma e_p$ and $\grave{r}^T G = \rho e_i^T$ with $$\rho \cdot \gamma = \frac{k}{\pi}. \quad \text{(formula 3)}$$

The '+' indicates that a matrix was extended.

In fact, one then obtains:

$$G'^+ =$$

$$R \cdot G \cdot C = G + \rho e_{\bar{q}} e_{\bar{i}}^T - e_{\bar{q}} G_{\bar{q}} + \gamma e_{\bar{q}} e_{\bar{i}}^T + e_{\bar{q}} \grave{r} G \grave{c} e_{\bar{i}}^T - \gamma e_{\bar{q}} e_{\bar{q}}^T e_{\bar{i}}^T - G_{\bar{i}} e_{\bar{i}}^T -$$

$$\rho e_{\bar{q}} e_{\bar{i}}^T e_{\bar{i}}^T + G_{\bar{q}\bar{i}} e_{\bar{q}} e_{\bar{i}}^T = G - e_{\bar{q}} G_{\bar{q}} = G_{\bar{i}} e_{\bar{i}}^T + G_{\bar{q}\bar{j}} e_{\bar{q}} e_{\bar{i}}^T + e_{\bar{q}} \grave{r}^T G \grave{c} e_{\bar{i}}^T.$$

This matrix is the matrix G with row p and column j zeroed out except for element $G'^-_{pj}$, whereby:

$$G'^+_{\bar{q}\bar{i}} = e_{\bar{q}} \grave{r}^T G \grave{c} e_{\bar{i}}^T = \rho \gamma e_{\bar{i}}^T G^{-1} G G^{-1} e_{\bar{q}} = \rho \gamma e_{\bar{i}}^T G^{-1} e_{\bar{q}} = \rho \gamma \pi.$$

By selecting $\rho\gamma$ according to formula 3, the desired value of $G'^-_{\bar{q}\bar{i}}=\kappa$ is obtained. To update the factorization, the updates R and C have to be applied to the existing factorization $G'^- = RGC = RLMUC$. The update UC is equivalent to the column update and, similarly, the update RL is equivalent to a row update discussed before. Considering only UC, in order to find a rank-1 update matrix $R_U$ is determined such that $(R_U UC)^T$. This can be achieved with $$R_U = I + e_{\bar{i}}(\bar{c} - e_{\bar{i}})^T, \text{ with } \bar{c}^T U = \bar{\gamma} e_{\bar{i}}^T \quad \text{(formula 4)}$$

$$\text{for } \bar{Y} = \frac{1}{\gamma \pi}.$$

In fact, this yields $$(R_U UC)_{\bar{i}} = e_{\bar{i}}^T R_U UC = (e_{\bar{i}}^T + (\bar{c} - e_{\bar{i}})^T)UC = \bar{c}^T UC = \gamma \grave{c}_{\bar{i}} e_{\bar{i}}^T.$$

From $c_{\bar{i}} = \gamma \pi$ follows formula 4. The property $U_{\bar{i}} = e_{\bar{i}}^T$ continues to hold for subsequent updates that do not "repopulate" the $\bar{i}$-th vector of the kernel matrix. Such updates will be discussed in the following section. There still exists the option to choose $\gamma$, $\rho$ and $\kappa$ such that $\gamma \rho \pi = \kappa$. Mathematically, all choices are equivalent. However, computationally the choice does have an impact, both numerically and regarding complexity. According to some embodiments, $\gamma = \rho = 1$ is used. Thus, one obtains $\kappa = \pi$. With these choices, both the row and the column updates are numerically equivalent to any regular row or column update. In particular, no scaling of the new vectors for the factors L and U needs to be executed. Contrasting this again with CSM, KSM performs a row and a column update rather than just one column update for CSM. As mentioned before other embodiments only perform a row or a column update and are thus of the same complexity of TSM. Furthermore, typically the kernel initially grows during the simplex algorithm and then remains around a certain dimension. This means that removed rows and columns typically will be readded soon later by extending the factorization again. At this point there exists the option to insert the newly added row and column back into factorization at the previously vacated positions. This repopulation of the kernel factorization is discussed next.

b.5) Repopulating the Factorization

Repopulating the factorization is a second version of the previously mentioned case (p,j) which is applied when the factorization has previously been shrunk and contains "holes". To do this, a row and column update is executed for the row and column that is being repopulated. However, there is a difference to growing of the factorization as discussed above, since now the row and column being repopulated already contain data in the factorization. Following formula 2 and using $I=\{1, \ldots, \bar{j}-1\}$, $J=\{\bar{j}+1, \ldots, k\}$, $P=\{1, \ldots, \bar{q}-1\}$ and $Q=\{\bar{q}+1, \ldots, k\}$, $G^+$ is represented by the current factorization and is given by:

$$G^+ = \begin{pmatrix} G_{PI} & 0 & G_{PJ} \\ 0 \ldots 0 & \kappa & 0 \ldots 0 \\ G_{QI} & 0 & G_{QJ} \end{pmatrix}$$

In order to repopulate the "hole" (p,j) by applying a row and column update, R and C, are respectively calculated such that $$G' = R \cdot G \cdot C = \begin{pmatrix} G_{PI} & v_P & G_{PJ} \\ w_I^T & \kappa' & w_J^T \\ G_{OI} & v_O & G_{OI} \end{pmatrix}.$$

Thus, G' is indeed the updated kernel matrix and $$(W_i^T, \kappa', w_{jl}^T) = A_{IB}, \text{ and } \begin{pmatrix} v_P \\ \kappa' \\ v_Q \end{pmatrix} = A_{D,j}$$

Let $\dot{r}^T=(\dot{r}_P^T, 0, \dot{r}_Q^T)$ and $\dot{c}^T=(\dot{c}_I^T, 0, \dot{c}_J^T)$ with $\dot{r}^T G^- = (w_I^T, 0, w_J^T)$ and $\dot{c}^T G^{31} = (v_P^T, 0, v_Q^T)$, respectively, i.e., $\dot{r}^T$ and $\dot{c}^T$ are update vectors computed by the simplex algorithm for the upcoming growing update. Then, formula 5 is achieved by selecting $$R = \begin{pmatrix} I_{PP} & 0 & 0 \\ \dot{r}_P^T & \rho' & \dot{r}_Q^T \\ 0 & 0 & I_{QQ} \end{pmatrix} \text{ and}$$

$$C = \begin{pmatrix} I_{II} & \bar{c}_I & 0 \\ 0 & \gamma' & 0 \\ 0 & \varepsilon_J & I_{II} \end{pmatrix} \text{ with } \gamma' \rho' = \frac{\pi}{K}.$$

In fact, one obtains:

$$R \cdot G^+ \cdot C = \begin{pmatrix} I_{PP} & 0 & 0 \\ \dot{r}_P^T & \rho' & \dot{r}_Q^T \\ 0 & 0 & I_{QQ} \end{pmatrix} \cdot \begin{pmatrix} G_{PI} & 0 & G_{PJ} \\ 0 \dots 0 & \kappa & 0 \dots 0 \\ G_{QI} & 0 & K_{QJ} \end{pmatrix}.$$

$$\begin{pmatrix} I_{II} & \tilde{c}_i & 0 \\ 0 & \gamma' & 0 \\ 0 & \tilde{c}_j & I_{II} \end{pmatrix} = \begin{pmatrix} G_{PI} & v_P & G_{PI} \\ w_P^T & \delta' & w_J^T \\ G_{QI} & v_Q & G_{OI} \end{pmatrix},$$

with $\delta' = w^T G^{-1} v + \kappa \cdot \rho' \gamma'$. Recalling that $\pi = \kappa' - w^T G^{-1} v$ is the pivot element and enforcing that $\delta' = \kappa'$ one obtains $\pi = \kappa \cdot \rho' \gamma'$. In the following, the description will be restricted to the update of U while noting that the update of L is analogous. Without loss of generality, it is assumed that U is already permuted in triangular form. Then the following computation steps are executed:

$$U \cdot C = \begin{pmatrix} U_{II} & U_{I1} & U \\ 0 & 1 & 0 \\ 0 & 0 & U_{JJ} \end{pmatrix} \cdot \begin{pmatrix} I_{II} & c_1 & 0 \\ 0 & \gamma' & 0 \\ 0 & c_j & I_{JJ} \end{pmatrix} = \begin{pmatrix} U_{II} & U'_{I1} & U \\ 0 & \gamma' & 0 \\ 0 & U'_{IJ} & U_{JJ} \end{pmatrix},$$

where $U'_{Ii}=U_{Ic}+\gamma' \cdot U_{Ii}$ and $U'_{ji}=U_{Jc}+\gamma' \cdot U_{ji}$. In order to get $U'_{ii}=1$ a diagonal matrix $\Delta$ is factored out with all is except for $\Delta_{ii}=\gamma'$. Similar to the shrinking update, there exists a choice for $\rho$ and $\gamma$ as long as $$\rho' \gamma' = \frac{\pi}{\kappa}$$

is maintained.

BRIEF DESCRIPTION OF THE DRAWINGS

The above and other items, features and advantages of the invention will be better understood by reading the following more particular description of embodiments of the invention in conjunction with the figures wherein.

DETAILED DESCRIPTION OF THE INVENTION

Figure 1:
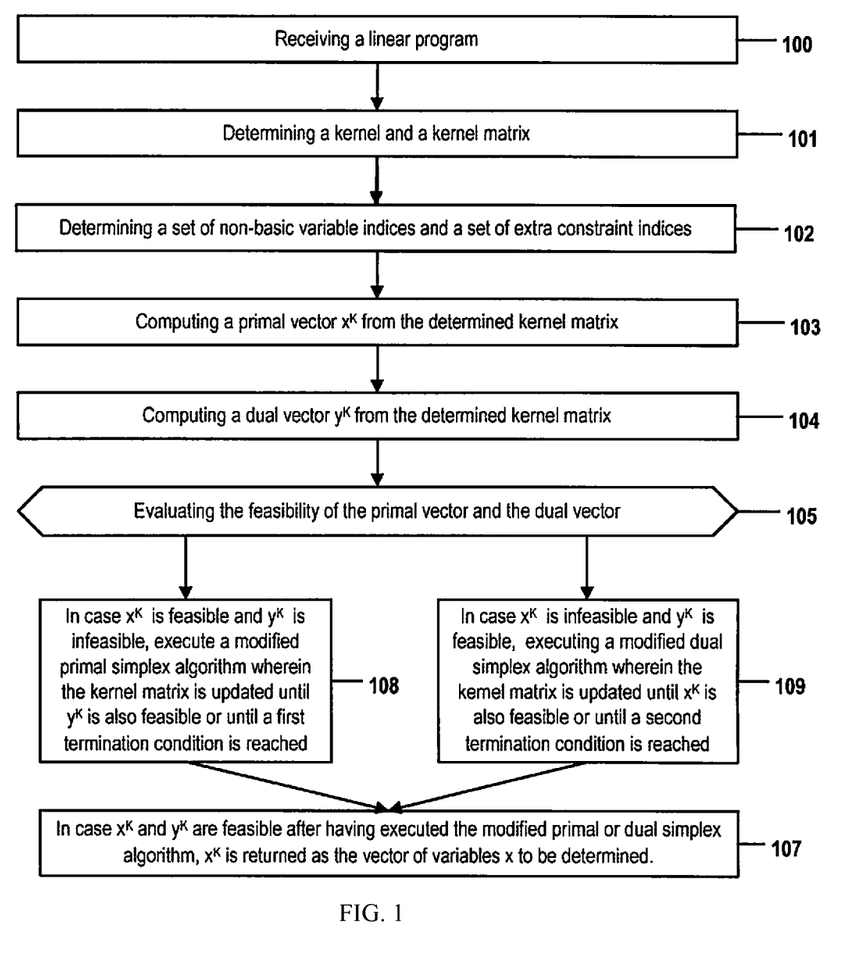
FIG. 1 is a flow chart of an embodiment of the computer-implemented method.
Figure 2:
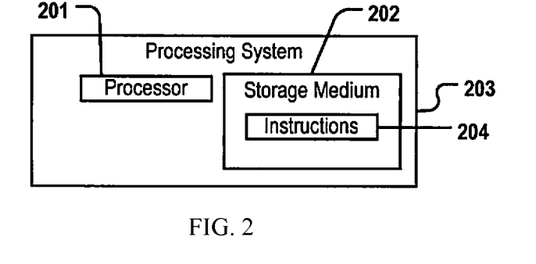
FIG. 2 is a block diagram of a processing device.
Figure 3A:
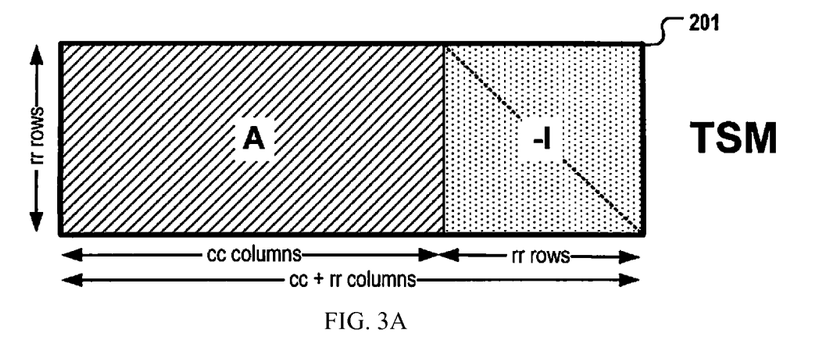
FIG. 3A and FIG. 3B depict some matrices used in the traditional simplex method TSM.
Figure 3B:
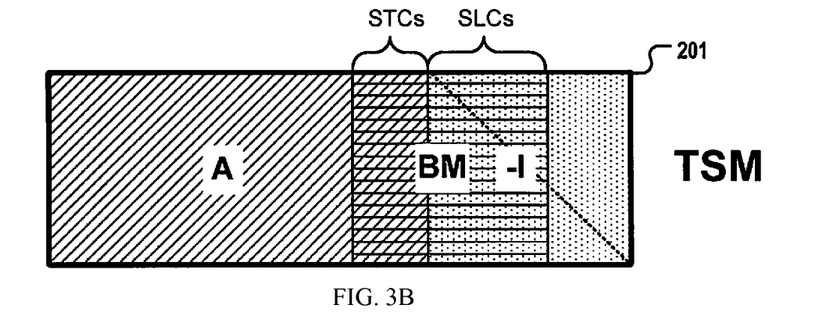
Figure 4:
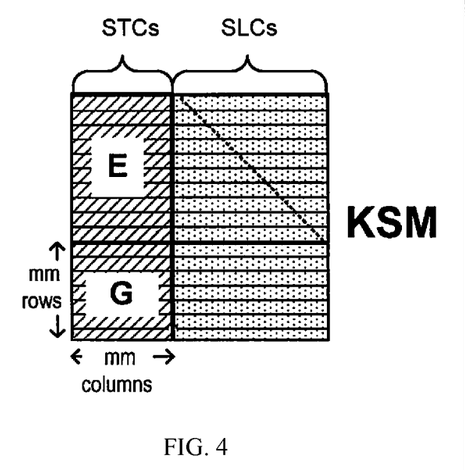
FIG. 4 depicts some matrices used in the modified simplex method KSM.

FIG. 1 depicts a computer implemented method for solving a linear program, the formulation of the linear program comprising an original matrix. The linear program to be solved is received in step 100. In step 101 a kernel and its kernel matrix is determined from the original matrix of the linear program. In step 102, a set of non-basic variable indices N and a set of extra constraint indices E is determined. Then, a primal kernel vector is calculated in step 103 from the determined kernel matrix. In step 104, a dual kernel vector is calculated from the determined kernel matrix. In decision step 105, the feasibility of the primal kernel vector and the dual kernel vector is evaluated. In case the primal kernel vector and the dual kernel vector are both feasible the kernel is considered as optimal. In case the primal kernel vector is feasible and the dual kernel vector is infeasible, a modified primal simplex algorithm is executed in step 108. Therein, the kernel matrix is updated in one or more modified simplex iterations until the dual kernel vector is also feasible or until a first termination condition is reached. In case the kernel becomes optimal as a result of executing step 108, $x^K$ is returned in step 107 as the vector of variables to be determined and the method may be stopped. In case the primal kernel vector is infeasible and the dual kernel vector is feasible, a modified dual simplex algorithm is executed in step 109. Therein, one or more modified simplex iterations are executed until a second termination condition is reached or until the primal kernel vector is also feasible. Such a first or second condition may be, for example, a maximum number of modified simplex iterations. In case both the primal kernel vector and the dual kernel vector both become feasible (in other words, if the kernel becomes optimal) as a result of executing step 109, $x^K$ is returned in step 107 as the vector of variables to be determined and the method may be stopped. Each modified simplex iteration executed in steps 108 or 109 comprises a kernel update step. At the end of each modified simplex iteration, the feasibility of the primal and dual kernel vector is evaluated. In case it is determined that the primal and the dual kernel vectors are feasible, the kernel matrix is s optimal and step 107 may be executed. FIG. 2 depicts a block diagram of a processing system 203, e.g. a desktop PC or a notebook, comprising a non-volatile storage medium 202 with computer-interpretable instructions 204 and a processor 201. The processor executing the instructions is caused to execute the KSM method according to any of the above embodiments. FIG. 3A depicts an original matrix A. the original matrix is transformed into equality form in TSM by introducing slack variables by means of a unity matrix −I. Thus, the matrix of the equality form is larger than the original matrix A. While the original matrix has rr rows and cc columns, the matrix of the equation form 301 has cc+rr columns and rr rows. A basis matrix BM is determined from the matrix of the equation form, whereby said basis matrix BM is updated in one or more traditional simplex iterations until a solution was found or a termination condition is reached. The basis matrix comprises one or more structural columns having been derived from the original matrix and one or more slack columns relating to columns introduced by the unit matrix −I, as depicted in FIG. 3B. FIG. 4 depicts a sub-matrix which corresponds to the basis matrix BM of FIG. 3b. The matrix of FIG. 4 comprises a kernel matrix G, wherein the number of mm rows and number of mm columns of the kernel matrix are identical and are respectively equal to or smaller than the number of rows of the original matrix and are respectively equal to or smaller than the number of columns of the original matrix. Accordingly, the kernel matrix used in KSM requires less storage space compared to a basis matrix used in TSM.

The invention claimed is:

1. A non-volatile storage medium with computer-interpretable instructions for reducing an amount of memory space required for a kernel matrix, the computer-interpretable instructions when executed causes a processor of a processing device to:
   reduce an amount of memory space required for variables of a linear program (LP) on the processing device with limited memory upon receiving a linear program, a canonical form of the linear program being:
   minimize $c^T x$; subject to $Ax \geq b$; $x \geq 0$,
   whereby x represents the vector of variables to be determined, b in $R^m$ and c in $R^m$ respectively represent a vector of given coefficients and original matrix (A) represents a matrix of given coefficients;
   determine a kernel K and determining a kernel matrix G of the kernel K, wherein the kernel K=(D, B), wherein the kernel matrix G is calculated as $G=A_{DB}$, wherein B is a set of basis variable indices, D is a set of defining constraint indices such that $D \subseteq \{1, \ldots, m\}$, $B \subseteq \{1, \ldots, n\}$, $|D|=|B|$, and the kernel matrix is a non-singular submatrix of the original matrix;
   determine a set of non-basic variable indices N and a set of extra constraint indices E, wherein $N=\{1, \ldots, n\} \setminus B$ and $E=\{1, \ldots, m\} \setminus D$;
   compute a primal kernel vector ($x^K$) from the determined kernel such that $Gx_E^K = b_D$, $x_N^K = 0$;
   compute a dual kernel vector ($y^K$) from the determined kernel such that $y_E^K = 0$, $(y_D^K)^T G = c_B^T$;
   evaluate the feasibility of the primal kernel vector and of the dual kernel vector;
   execute, in response to a case when the primal kernel vector is feasible and the dual kernel vector is infeasible, a modified primal simplex algorithm wherein the kernel and the kernel matrix are updated to increase feasibility of the dual kernel vector in one or more modified simplex iterations until the dual kernel vector is also feasible or a first termination condition is reached;
   execute, in response to a case when the primal kernel vector is infeasible and the dual kernel vector is feasible, a modified dual simplex algorithm wherein the kernel and the kernel matrix are updated to increase feasibility of the primal kernel vector in one or more modified simplex iterations until the primal kernel vector is also feasible or until a second termination condition is reached; and,
   return, in response to a case when the primal and the dual kernel vectors are feasible as a result of executing the modified primal or dual simplex algorithm, the primal kernel vector ($x^K$) as the vector of variables x to be determined.

2. The non-volatile storage medium of claim 1,
   wherein a kernel slack vector $s^K$ is calculated such that $s^K = Ax^K - b$;
   wherein a kernel reduced cost vector $d^K$ is calculated such that $(d^K)^T = c^T - (y^K)^T A$;
   wherein the primal kernel vector is feasible if $x^K \geq 0$ and $s^K \geq 0$; and,
   wherein the dual kernel vector is feasible if $y^K \geq 0$ and $d^K \geq 0$.

3. The non-volatile storage medium of claim 1, wherein the matrix of given coefficients is stored in a first copy in a row-wise data structure and in a second copy in a column-wise data structure for executing the modified primal simplex algorithm and the modified dual simplex algorithm respectively, the row-wise data structure and the column-wise data structure being of a same data structure type.

4. The non-volatile storage medium of claim 1, wherein the kernel matrix is stored as part of a data structure comprising the matrix of given coefficients,
   wherein all nonzero elements in each column of the matrix of given coefficients which are also contained in the kernel matrix are sorted in such a way that all said nonzero elements are grouped together to form an adjacent sequence of rows in each kernel column;
   wherein all nonzero elements in each row of the matrix of given coefficients which are also contained in the kernel matrix are sorted in such a way that all said nonzero elements are grouped together to form an adjacent sequence of columns in each kernel row; and,
   wherein the adjacent sequence of rows in each kernel column and also the adjacent sequence of columns in each kernel row are stored in succeeding memory blocks of the data structure.

5. The non-volatile storage medium of claim 1, further comprising computer-interpretable instructions when executed causes the processor of the processing device to:
   execute the modified dual and the modified primal simplex algorithm,
   wherein in response to a case when pointers to columns of the kernel matrix are used as input arguments, the modified primal simplex algorithm is executed and
   wherein in response to a case when pointers to rows of the kernel matrix are used as input arguments, the modified dual simplex algorithm is executed.

6. The non-volatile storage medium of claim 1, further comprising computer-interpretable instructions when executed causes the processor of the processing device to factorize the kernel matrix and storing the generated factorization in a factorization data structure, wherein the factorization is an LU-factorization.

7. The non-volatile storage medium of claim 6, wherein a same factorization data type is used for storing the factors resulting from the factorization and for storing for each of the factors a respective transpose.

8. The non-volatile storage medium of claim 6, further comprising computer-interpretable instructions when executed causes the processor of the processing device to automatically evaluate whether updating the factors with results provided by one of the one or more modified simplex iterations is computationally more expensive than creating the factors in a Previously Presented factorization step, and to execute a factorization for each modified simplex iteration unless the evaluation returns as result that updating the factors is computationally less expensive than a Previously Presented factorization.

9. The non-volatile storage medium of claim 1, wherein the computer-interpretable instructions to update the kernel and the kernel matrix when executing modified primal simplex algorithm comprises computer-interpretable instructions to shrink the kernel and the kernel matrix, wherein shrinking comprises removing one first row index (i) from the set of defining constraint indices D, thereby removing a first row being indicated by the first row index from the kernel matrix, and removing one first column index (q) from the set of basic variable indices B, thereby removing a first column being indicated by the first column index from the kernel matrix.

10. The non-volatile storage medium of claim 9, wherein the computer-interpretable instructions to execute each of the modified primal simplex iterations comprises computer-interpretable instructions to execute a pricing step and a ratio test step,
wherein in the pricing step the second column index (j) or the first row index (i) is determined, wherein the second column index (j) is determined by selecting a column index (j) such that $d^K_j \leq 0$ and wherein the first row index (i) is determined by selecting a row index (i) such that $y^K_i \leq 0$;
wherein in the ratio test step the second row index (p) and the first column index (q) is determined, wherein the second row index (p) is selected such that $p=\text{argmin}\{\lambda_i: i \in E\}$ and the first column index (q) is selected such that $q=\text{argmin}\{\mu_j: j \in B\}$, wherein $\lambda$ and $\mu$ represent the step length obtained by fulfilling a bound of the corresponding variable or slack index with equality, wherein in case the first column index (q) is smaller than the second row index (p), the first column index (q) is returned, and wherein in case the first column index (q) is larger than the second row index (p) the second row index (p) is returned.

11. The non-volatile storage medium of claim 10, wherein the computer-interpretable instructions to execute one of the modified primal simplex iterations comprises computer-interpretable instructions to execute a kernel update step, wherein to execute the kernel update step comprises one of the following steps:
in a case when the first row index (i) was determined and the first column index (q) was returned, the kernel matrix is shrunk;
in a case when the second column index (j) was determined and the second row index (p) was returned, the kernel matrix is extended;
in a case when the second column index (j) was determined and the first column index (q) was returned, the column exchange is executed on the kernel matrix;
in a case when the first row index (i) was determined and the second row index (p) was returned, the row exchange is executed on the kernel matrix.

12. The non-volatile storage medium of claim 9, wherein the kernel matrix is factorized, thereby generating a LU-factorization, the LU-factorization being updated upon an update of the kernel matrix at least for one modified simplex iteration, wherein updating the LU factorization when exchanging a column or a row is executed according to a Forrest-Tomlin update and wherein updating the LU factorization when shrinking the kernel matrix comprises computer-interpretable instructions to:
update the LU factorization, thereby propagating the removal of said determined row and column to the LU factorization, the update of the LU factorization being executed according to either applying a column-wise Forrest-Tomlin update suitable for replacing the first column with a first unit vector having the element 1 in the position of the first row; or to apply a row-wise Forrest-Tomlin update suitable for replacing the first row with a second unit vector having the element 1 in the position of the first column to be removed from the kernel matrix; or to apply a column-wise Forrest-Tomlin update suitable for replacing the first column with a first unit vector having the element 1 in the position of first row, and to apply a row-wise Forrest-Tomlin update suitable for replacing the first row with a second unit vector having the element 1 in the position of the first column to be removed from the kernel matrix.

13. The non-volatile storage medium of claim 12, wherein the computer-interpretable instructions to execute the LU-factorization when extending the kernel matrix comprises computer-interpretable instructions to:
upon determining that the second row has in a previous kernel update step been removed from the kernel matrix while the LU factorization has been updated, the LU factorization is updated by applying a Forrest-Tomlin update suitable for replacing the first unit vector with said second column;
upon determining that the second column has in a previous kernel update step been removed from the kernel matrix while the LU factorization has been updated, the LU factorization is updated by applying a Forrest-Tomlin update suitable for replacing the second unit vector introduced with said second row;
upon determining that the LU factorization has been updated in a previous kernel update step, the LU factorization is updated by applying a Forrest-Tomlin update being suitable for replacing the first unit vector introduced with said second column and being suitable for replacing the second unit vector introduced in the previous step C) with said second row; and,
in all other cases, adding a Previously Presented row to be computed from the second row to a lower triangular matrix L and adding a Previously Presented column to be computed from the second column to an upper triangular matrix U, the upper triangular matrix and the lower triangular matrix having been created by the LU-factorization from the kernel matrix.

14. The non-volatile storage medium of claim 1, wherein the computer-interpretable instructions to update the kernel and the kernel matrix when executing modified primal simplex algorithm comprises computer-interpretable instructions to extend the kernel and the kernel matrix, wherein the extension comprises adding a second row index (p) to the set of defining constraint indices D, thereby adding a second row being indicated by the second row index to the kernel matrix, and adding a second column index (j) to the set of basic variable indices B, thereby adding a second column being indicated by the second column index to the kernel matrix.

15. The non-volatile storage medium of claim 1, wherein the computer-interpretable instructions to update the kernel and the kernel matrix when executing modified primal simplex algorithm comprises computer-interpretable instructions to extend the kernel and the kernel matrix, wherein the extension comprises exchanging a column index of the kernel and exchanging a column indicated by said index of the kernel matrix, the exchange comprising removing a first column index (q) from the set of basic variable indices B, thereby removing a first column being indicated by the first column index from the kernel matrix, and adding a second column index (j) to the set of basic variable indices B, thereby adding a second column being indicated by the second column index to the kernel matrix.

16. The non-volatile storage medium of claim 1, wherein the computer-interpretable instructions to update the kernel and the kernel matrix when executing modified primal simplex algorithm comprises computer-interpretable instructions to extend the kernel and the kernel matrix, wherein the extension comprises exchanging a row index of the kernel and exchanging a row indicated by said index of the kernel matrix, the exchange comprising removing a first row index (i) from the set of defining constraint indices D, thereby removing a first row being indicated by the first row index from the kernel matrix, and adding a second row index (p) to the set of defining constraint indices D, thereby adding a second row being indicated by the second row index to the kernel matrix.

17. A data processing system for reducing an amount of memory space required for a kernel matrix, comprising:
  a processing device with limited memory and a computer processor, the computer processor configured to:
    reduce an amount of memory space required for variables of a linear program (LP) on the processing device with limited memory upon receiving a linear program, a canonical form of the linear program being:
      minimize $c^T x$; subject to $Ax \geq b$; $x \geq 0$,
    whereby x represents the vector of variables to be determined, b in $R^m$ and c in $R^m$ respectively represent a vector of given coefficients and original matrix (A) represents a matrix of given coefficients;
    determine a kernel K and determining a kernel matrix G of the kernel K, wherein the kernel K=(D, B), wherein the kernel matrix G is calculated as $G=A_{DB}$, wherein B is a set of basis variable indices, D is a set of defining constraint indices such that $D \subseteq \{1, \ldots, m\}$, $B \subseteq \{1, \ldots, n\}$, $|D|=|B|$, and the kernel matrix is a non-singular submatrix of the original matrix;
    determine a set of non-basic variable indices N and a set of extra constraint indices E, wherein $N = \{1, \ldots, n\} \backslash B$ and $E = \{1, \ldots, m\} \backslash D$;
    compute a primal kernel vector ($x^K$) from the determined kernel such that $Gx_E^K = b_D$, $x_N^K = 0$;
    compute a dual kernel vector ($y^K$) from the determined kernel such that $y_E^K = 0$, $(y_D^K)^T G = c_B^T$;
    evaluate the feasibility of the primal kernel vector and of the dual kernel vector;
    execute, in response to a case when the primal kernel vector is feasible and the dual kernel vector is infeasible, a modified primal simplex algorithm wherein the kernel and the kernel matrix are updated to increase feasibility of the dual kernel vector in one or more modified simplex iterations until the dual kernel vector is also feasible or a first termination condition is reached;
    execute, in response to a case when the primal kernel vector is infeasible and the dual kernel vector is feasible, a modified dual simplex algorithm wherein the kernel and the kernel matrix are updated to increase feasibility of the primal kernel vector in one or more modified simplex iterations until the primal kernel vector is also feasible or until a second termination condition is reached; and,
    return, in response to a case when the primal and the dual kernel vectors are feasible as a result of executing the modified primal or dual simplex algorithm, the primal kernel vector ($x^K$) as the vector of variables x to be determined.

* * * * *